UNITED STATES PATENT OFFICE.

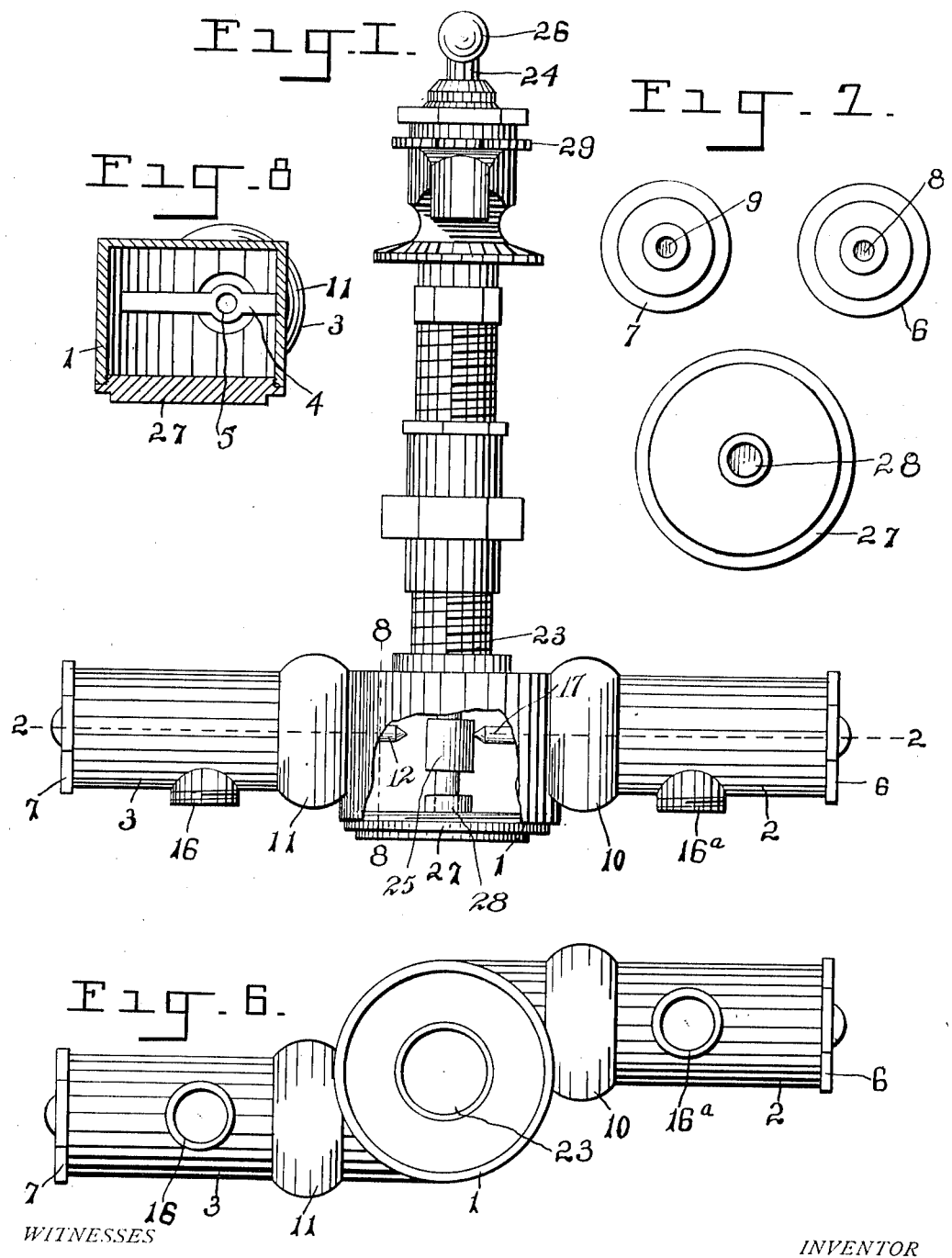

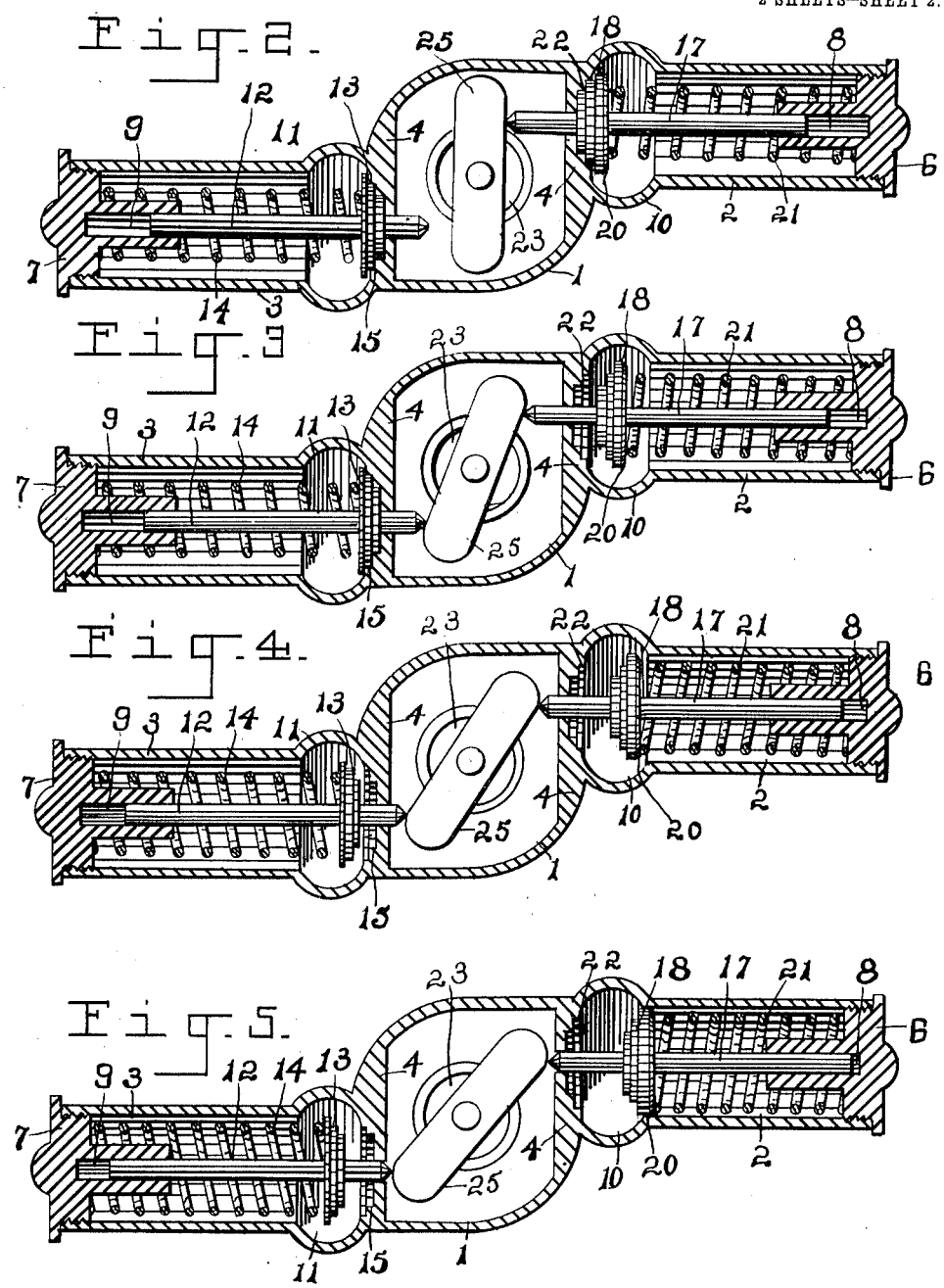

JOSEPH G. HUYE, OF NEW ORLEANS, LOUISIANA, ASSIGNOR OF ONE-HALF TO WILLIAM J. KERNAGHAN, OF NEW ORLEANS, LOUISIANA.

AUTOMATIC SELF-CLOSING COMPOUND MIXING-FAUCET.

1,061,293.  Specification of Letters Patent.  Patented May 13, 1913.

Application filed June 14, 1912. Serial No. 703,689.

*To all whom it may concern:*

Be it known that I, JOSEPH G. HUYE, a citizen of the United States, residing at New Orleans, in the parish of Orleans and State of Louisiana, have invented certain new and useful Improvements in Automatic Self-Closing Compound Mixing-Faucets, of which the following is a specification This invention relates to compound mixing faucets especially applicable for use in public and other lavatories, and has for its chief object to provide a faucet of the above character which shall be absolutely self-closing, which object, among others, is accomplished by the construction and combination of parts hereinafter more particularly set forth and claimed.

In the accompanying drawings forming part of this application: Figure 1 represents a view in front elevation of a device embodying my invention; Fig. 2, a horizontal longitudinal section on line 2—2 of Fig. 1, the valves, valve-stems and actuating cam or cross-head being shown in side elevation and plan views, the cam being in neutral position; Fig. 3, a similar view, the cam being in the first operative position, that is, engaging the end of the stem 17 of the cold water valve 18 and unseating the same; Fig. 4, a similar view, the cam being in the second operative position, that is, engaging the stems of both valves and unseating the same, allowing the cold and hot water to mix in chamber 1 and pass therefrom through pipe 23; Fig. 5, a similar view, the cam being in the third position, that is, engaging the stems of both valves, forcing the cold water valve in a straight line off its seat 22 and into the cylindrical part of chamber 2, thus cutting off the cold water while forcing the valve 13 farther to the left and allowing a greater flow of hot water; Fig. 6, a plan view of the bottom of the casing, the plug 27 and the interior parts being removed, also the valves and cam and rod or shaft, showing the supply nipples for the hot and cold water, their arrangement with relation to each other and the central common exit; Fig. 7, a detail plan view of the three plugs 6, 7 and 27, showing their central bores; and Fig. 8, a view in cross section on line 8—8 of Fig. 1, looking in the direction of the arrow, showing one of the guides or webs 4 perforated at 5 and its arrangement in the central chamber.

The casing is integral, but divided up into three communicating chambers, valves opening and closing such communication, a central chamber 1 circular in shape, a chamber 2 cylindrical for most of its length extended on the right hand side of central chamber 1 and another chamber 3 similar to chamber 2 extended on the left hand side of the said central chamber; said chambers 2 and 3 being offset on opposite sides of the longitudinal central line of said casing. Webs or guides 4 are arranged in said central chamber, on opposite sides thereof, extending across in front of the centers of the openings of said chambers 2 and 3 and are provided with perforations 5 at said central points respectively.

The chambers 2 and 3 are provided near their outer ends with internal screw-threads which are engaged by the external screw-threads on plugs 6 and 7 respectively, said plugs being centrally bored as at 8 and 9 respectively in their inner faces. The chamber 2 is further provided with an annular curved enlargement 10 and chamber 3 with a similar enlargement 11, said enlargements being provided to allow the water to pass around the respective valves.

A valve-stem 12 is pocated in chamber 3, having its outer or left end resting in and guided by the bore 9 of plug 7 and its inner end projecting through and guided by perforation 5 in the web 4 into left hand side of the rear part of chamber 1. This stem 12 carries a disk valve 13 provided with the usual gasket and working in the enlargement 11 of said chamber. This valve may be integral with said valve stem 12 or may be secured thereto to move longitudinally therewith in any convenient manner. A helical spring 14 slipped over said stem 12 and bearing against the plug 7 with its outer end and against the rear face of the valve 13 with its inner end under normal conditions keeps said valve 13 firmly on its seat 15. A hot-water supply pipe (not shown) attached to nipple 16 communicates with the interior of said chamber 3 near the outer end thereof.

A valve-stem 17 is arranged in chamber 2 with its outer or right hand end sliding in and guided by bore 8 of plug 6 in its inner end projecting through and guided by the perforation 5 of the corresponding web or guide 4. Said stem 17 projects through into chamber 1 slightly farther than stem 12 and carries a thick disk valve 18 provided with the usual gasket on its inner face and has the annular edge of its outer face slightly beveled as at 20. A helical spring 21 slipped over said stem 17 bears against the inner face of plug 6 and the outer face of valve 18 and under normal conditions keeps said valve 18 firmly on its seat 22. Said valve 18 works in the enlargement 10 and a slight way to the right thereof into the cylindrical part of chamber 2, being of such diameter that in its extreme position to the right it will fit snugly into the cylindrical part of chamber 2 and stop all flow of water therefrom, the bevel 20 above mentioned acting as a guide to insure the prompt and correct entrance of valve 18 into said cylindrical part of this chamber 2.

An outlet pipe 23 is provided leading from the center of the top of chamber 1 and forming communication between the interior thereof and the usual spout or nozzle. A rod or vertical shaft 24, much smaller in diameter than the internal diameter of said pipe 23, is located therein and carries near its lower end a cross-bar or cam 25 fixed rigidly thereto and adapted to move and turn therewith. A handle 26 is attached to the upper end of shaft or rod 24 in any convenient manner.

A plug 27 is screwed into the bottom of chamber 1, effectually closing the same, and is provided with a central bore 28 which serves as a bearing for the lower end of shaft 24 which extends thereinto.

A dial comprising an indicator 29 may be supplied, if desired, though this is, of course, not essential.

The operation is as follows: From the extreme left or neutral position of the handle 26, the cross-bar or cam 25 is, by means of said handle and rod 24, turned from its normal position shown in Fig. 2 into the first position, see Fig. 3. In so turning the cam 25 will engage the end of stem 17, it projecting the farthest into chamber 1. This will move valve 18 off from its seat 22, allowing the escape of cold water from chamber 2. In this position the cross-head or cam 25 will not touch the end of stem 12, consequently no hot water will pass into chamber 1. To get warm water the handle and cross-bar or cam 25 are turned still farther toward the right to the second position. In this position the said cross bar will engage the ends of both valve stems see Fig. 4 and both valves will be unseated, the valve 18 being a little farther from its seat than valve 13, by reason of the greater protrusion of its stem 17 into the chamber 1. In this position both hot and cold water will enter the chamber 1, mixing therein and passing out through pipe 23. To get hot water only the handle and cross-bar or cam 25 are turned still farther to the right to the third and last position. In this position the ends of both stems will be engaged by the cam 25, see Fig. 5, the valve 18 will be in its extreme right hand position, fitting snugly into the cylindrical part of chamber 2, cutting off all flow of cold water therefrom, while the valve 13 will be in its extreme left hand position, permitting the rapid escape of hot water therefrom. In all three of these positions it is obvious, by reason of the valve stems engaging the cam on opposite sides and near its opposite ends, that as soon as the handle 26 is released the springs 14 and 21 will force the valves 13 and 18 back on their respective seats 15 and 22 and force the cam or cross-bar back into neutral position, thus cutting off all flow of water, this action being automatic and instantaneous.

It is perfectly obvious that minor changes may be made in the combination, construction and arrangement of the parts of this invention without substantially departing therefrom, all of which are meant to be covered and protected by the claims.

Having thus described my invention, what I claim as new and desire to secure by Letters Patent is:

1. A faucet casing provided with a central chamber having valve seats on opposite sides thereof and two laterally extending chambers communicating with said central chamber through said seats, these latter chambers being out of line with each other, a pair of valves having stems and governing the flow through said lateral chambers respectively, springs tending to hold said valves on their seats and cause the protrusion of said stems into said central chamber, a cross-bar in said central chamber and means for turning said cross-bar to act on said stems, the cross-bar returning to its neutral position upon the release of said means.

2. A faucet-casing comprising a central chamber, a laterally extending chamber communicating therewith and having an enlargement at its inner end provided with valve seats at its inner side and outer side respectively, a valve located in said enlargement and adapted to fit on either of said seats, a stem carried by said valve, a spring tending to force said valve on its inner seat and to cause the protrusion of said stem into said central chamber, another laterally extending chamber communicating with said central chamber on the opposite side from the lateral chamber first mentioned, an inwardly spring pressed valve for closing this second lateral chamber and carrying a valve-stem which is arranged to enter said central chamber and a device rotatable in said central chamber arranged for contact with said valve stems to move said valves off from their seats.

3. A faucet-casing having a chamber and two opposite inlets arranged out of line with each other, in combination with inwardly closing spring pressed valves provided with inwardly presented stems and governing said inlets, said stems running parallel to each other, and a device rotatable in said chamber and arranged and adapted to act on said stems for opening the valves and to be turned by the said stems and the spring pressure thereon to permit the seating of said valves.

In testimony whereof, I have signed my name to this specification in the presence of two subscribing witnesses.

JOSEPH G. HUYE.

Witnesses:
WILLIAM G. KOST,
ALPHONSE J. CUNES.